(12) United States Patent
Lu et al.

(10) Patent No.: US 10,718,063 B2
(45) Date of Patent: Jul. 21, 2020

(54) METHOD FOR MODIFYING A SURFACE OF A METALLIC SUBSTRATE MATERIAL

(71) Applicant: City University of Hong Kong, Kowloon (HK)

(72) Inventors: Jian Lu, Kowloon (HK); Yang Yang Li, Kowloon (HK); Yawen Zhan, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 16/022,770

(22) Filed: Jun. 29, 2018

(65) Prior Publication Data

US 2020/0002833 A1    Jan. 2, 2020

(51) Int. Cl.
| | | |
|---|---|---|
| *C25F 3/02* | (2006.01) | |
| *C25D 5/34* | (2006.01) | |
| *G01N 21/65* | (2006.01) | |
| *C25D 5/18* | (2006.01) | |
| *C25D 3/56* | (2006.01) | |

(52) U.S. Cl.
CPC ............ *C25F 3/02* (2013.01); *C25D 5/18* (2013.01); *C25D 5/34* (2013.01); *G01N 21/658* (2013.01); *C25D 3/56* (2013.01)

(58) Field of Classification Search
CPC .................... G01N 21/658; C25F 3/02–14
See application file for complete search history.

(56) References Cited

U.S. PATENT DOCUMENTS

| | | | | |
|---|---|---|---|---|
| 4,452,675 A | * | 6/1984 | Cipris | ............ C25D 3/54 |
| | | | | 205/316 |
| 9,518,335 B2 | * | 12/2016 | Zhang | ............ C25F 3/14 |
| 9,840,789 B2 | * | 12/2017 | Zhang | ............ C25F 3/02 |
| 2004/0096981 A1 | * | 5/2004 | Weimer | ............ G01N 21/658 |
| | | | | 436/171 |
| 2009/0038957 A1 | * | 2/2009 | Sakakihara | ............ C25D 3/48 |
| | | | | 205/571 |

FOREIGN PATENT DOCUMENTS

KR        1019990033791 A  *  5/1999

OTHER PUBLICATIONS

Zhan et al., Bestow metal foams with nanostructured surfaces via a convenient electrochemical method for improved device performance, 9(8) Nano Research 2364 (Year: 2016).*
Moon—Machine Translation, KR 1019990033791 A (Year: 1999).*
Lou et al., Electroplating, Encyclopedia of Chem. Proc. (Year: 2006).*

* cited by examiner

*Primary Examiner* — Brian W Cohen
*Assistant Examiner* — Ho-Sung Chung
(74) *Attorney, Agent, or Firm* — Renner Kenner Greive Bobak Taylor & Weber

(57) ABSTRACT

A method for chemically modifying a surface of a metallic substrate material being made of a first metallic material includes the steps of a) bonding an alloy material made of the first metallic material and a second metallic material onto the substrate material; and b) etching away at least some of the first metallic material from the bonded substrate material to obtain a modified substrate material, wherein the modified substrate material has an increased specific surface area. A substrate for Surface Enhanced Raman Spectroscopy (SERS) includes a modified substrate material.

21 Claims, 17 Drawing Sheets

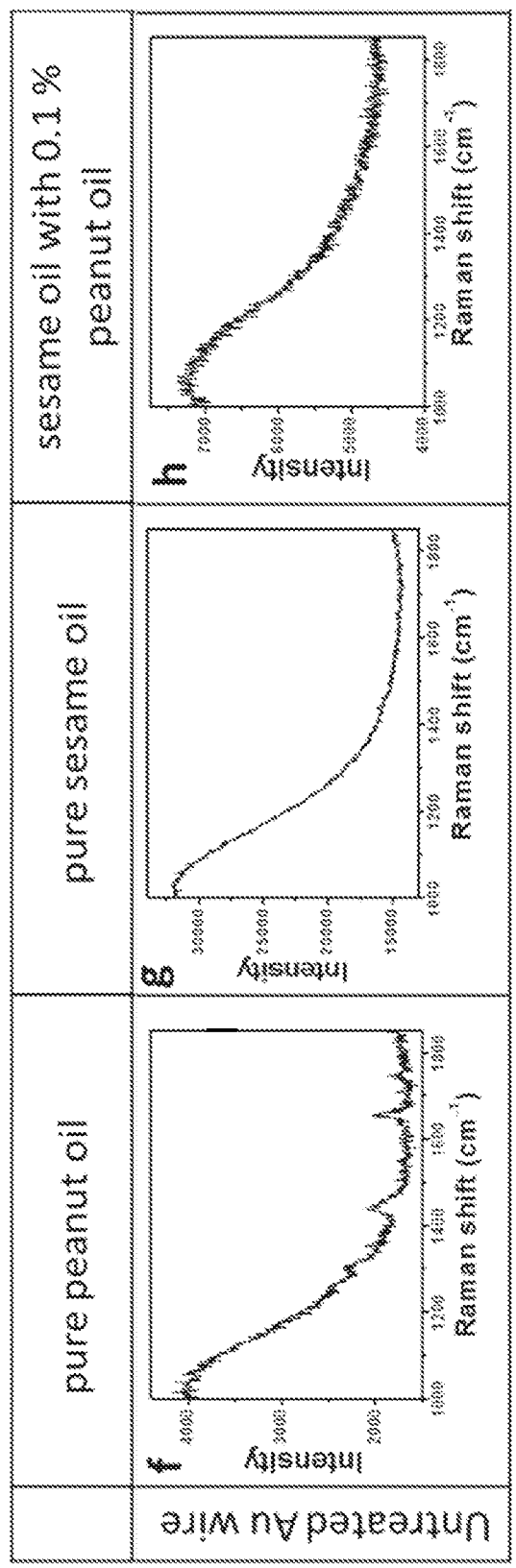

METHOD FOR MODIFIYING A SURFACE OF A METALLIC SUBSTRATE MATERIAL

TECHNICAL FIELD

The present invention relates to a method for chemically modifying a surface of a metallic substrate material in particular but not exclusively to a method for electrochemically modifying a surface of a metal wire to obtain a nanostructured surface on the metal wire. The present invention also pertains to a substrate for Surface Enhanced Raman Spectroscopy (SERS) as prepared by the present invention.

BACKGROUND OF THE INVENTION

Noble metals are metals that exhibit corrosion and oxidation resistance in moist air. The discovery of noble metal can be traced back to fourteen century. Conventionally, these metals are used in jewelry, coinage, electrical applications and the like. Up to day, the use of noble metals has been extended to the fields of sensors, actuators, full cells, microfluidic flow controllers and the like. However, currently available noble metal products usually possess smooth and macroscopic surface, rendering low device performance and weak bonding. Accordingly, there remains a strongly need in providing noble metal products offering enhanced device performance and possessing features that can be tuned readily.

SUMMARY OF THE INVENTION

The first aspect of the present invention relates to a method for chemically modifying a surface of a metallic substrate material being made of a first metallic material. The method comprises the steps of a) bonding an alloy material made of the first metallic material and a second metallic material onto the substrate material; and b) etching away at least some of the first metallic material from the bonded substrate material to obtain a modified substrate material, wherein the modified substrate material has an increased specific surface area.

Preferably, the modified substrate material has a higher specific surface area than the substrate material, particularly including a nanostructured surface with nano-pores.

In one embodiment of the first aspect, the first metallic material is less chemically reactive than the second metallic material. Preferably, the first metallic material comprises at least one of gold, silver or copper, whereas the second metallic material comprises at least one of silver or copper.

In one embodiment of the first aspect, step a) comprises the step of electrodepositing of the alloy material onto the metallic substrate material; and step b) comprises the step of electrochemically de-alloying of at least some of the first metallic material. Preferably, steps a) and b) are carried out in an electrochemical cell containing a solution of electrolyte comprising an ion of the second metallic material. Both the steps a) and b) are carried out by manipulating at least one of a voltage or a current density applied to the electrochemical cell.

In one embodiment of the first aspect, the solution of electrolyte further includes a reagent for passivating the second metallic material. Preferably, the reagent comprises a sulfur-containing compound. More preferably, the sulfur-containing compound is thiourea.

In one embodiment of the first aspect, the solution of electrolyte further includes an acid. Preferably, the acid comprises $HNO_3$, $H_2SO_4$ or chloroauric acid.

In one embodiment of the first aspect, the alloy material is in a form of micro-isles.

In one embodiment of the first aspect, step b) further including the step of detaching at least some of the second metallic material from the bonded substrate material as the first metallic material is etched away. Preferably, the second metallic material detached from the bonded substrate is in a form of particles with nano-pores.

In one embodiment of the first aspect, steps a) and b) are carried out for 1 to 60 seconds.

In one embodiment of the first aspect, the electrodeposition is carried out by applying at least one of a voltage ranged from −0.45V to −0.72V or a current density ranged from −0.1 to 10 $mA/cm^2$.

In one embodiment of the first aspect, the electrochemical de-alloying is carried out by applying at least one of a voltage ranged from 0.5V to 0.8V or a current density ranged from 0.1 to 10 $mA/cm^2$.

In one embodiment of the first aspect, the method further includes the step of repeating steps a) and b). Preferably, steps a) and b) are repeated for 20 to 200 times.

In one embodiment of the first aspect, the metallic substrate material is in a form of a wire, a foil, a foam or a mesh.

In the second aspect, there is provided a substrate for Surface Enhanced Raman Spectroscopy (SERS) applications. The substrate comprises a modified substrate material formed in accordance with the method of the first aspect of the invention.

Those skilled in the art will appreciate that the invention described herein is susceptible to variations and modifications other than those specifically described. The invention includes all such variations and modifications. The invention also includes all steps and features referred to or indicated in the specification, individually or collectively, and any and all combinations of the steps or features.

Other features and aspects of the invention will become apparent by consideration of the following detailed description and accompanying drawings.

BRIEF DESCRIPTION OF THE DRAWINGS

FIG. 2a is the SEM image of the Au wire without modification. FIG. 2b is the SEM image of the roughened Au wire. FIG. 2c is the SEM image of the nanoporous Ag particles generated during the modification. FIG. 2d is a magnified image of FIG. 2c.

FIG. 3a is the EDX spectrum of the roughened Au wire. FIG. 3b is the EDX spectrum of the nanoporous Ag particles.

FIG. 4a refers to the SERS mapping at 1362 $cm^{-1}$ of the roughened Au wire collected in 2 μm steps (scale bars: 20 μm) and the insert shows the optical image of the corresponding sample. FIG. 4b refers to one of the Rhodamine B ($10^{-12}$ M) Raman spectra from the mapping in FIG. 4a.

FIGS. 8a, 8b, 8c, 8d, 8e, 8f, 8g, and 8h provide graphs showing the SERS spectra of cooking oils on the roughened Au wire and the commercial Au wire.

FIG. 9a shows the SEM image of the Ag wire without modification. FIG. 9b shows the SEM image of the roughened Ag wire. FIG. 9c is a magnified SEM image of FIG. 9b showing the surface of the roughened Ag wire.

FIG. 10a refers to the SERS spectrum of Rhodamine 6G ($10^{-11}$ M) measured on the commercial Ag wire. FIG. 10b refers to the SERS spectrum of Rhodamine 6G ($10^{-11}$ M) measured on the roughened Ag wire.

DETAILED DESCRIPTION OF THE INVENTION

Figure 1:
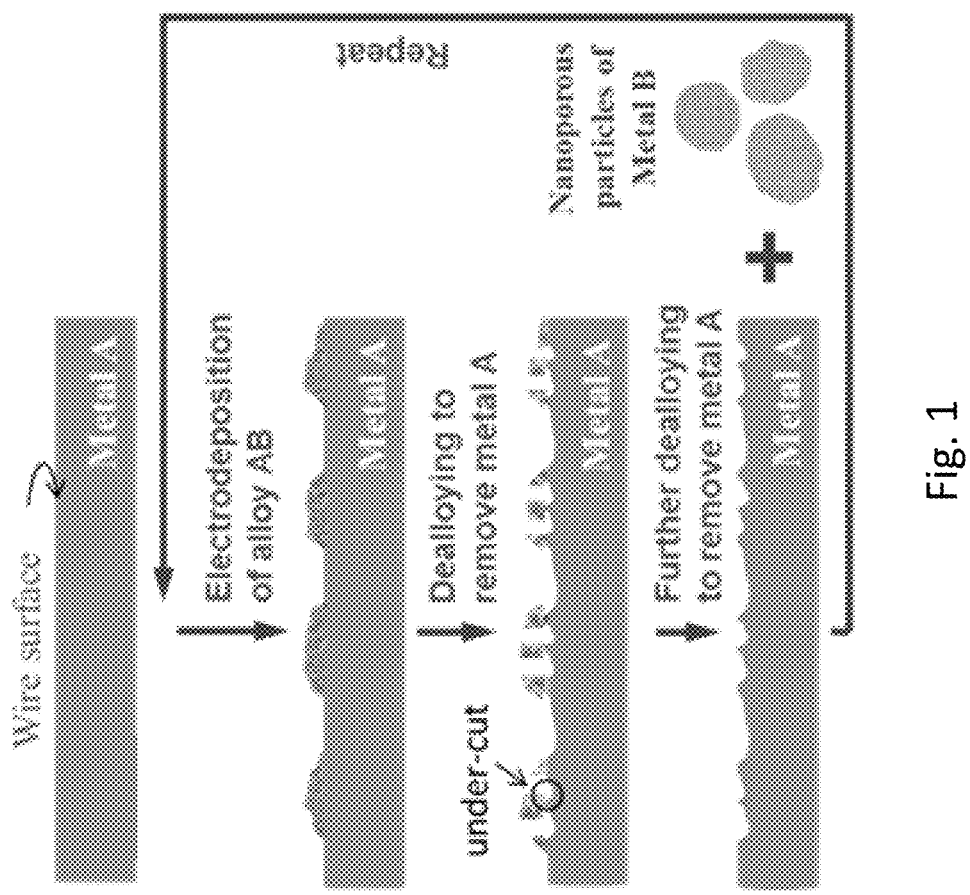
FIG. 1 refers to a schematic diagram showing the fabrication procedure for noble metal-based nanostructured wires and nanoporous powders.

Unless otherwise defined, all technical terms used herein have the same meaning as commonly understood by one skilled in the art to which the invention belongs.

As used herein, "comprising" means including the following elements but not excluding others. "Essentially consisting of" means that the material consists of the respective element along with usually and unavoidable impurities such as side products and components usually resulting from the respective preparation or method for obtaining the material such as traces of further components or solvents. The expression that a material is certain element is to be understood for meaning "essentially consists of" said element. As used herein, the forms "a," "an," and "the," are intended to include the singular and plural forms unless the context clearly indicates otherwise.

In the first aspect of the invention, there is provided a method for chemically modifying a surface of a substrate material in particular a metallic substrate material. The method can be applied to increase a surface area of the substrate material after modification.

The term "chemically modifying" refers to the modification, addition or removal of any of a variety of molecules of a subject through chemical reaction such that the subject's physical, chemical, electrochemical, optical, electrical properties or the like may change afterwards. In one embodiment, the chemical modification is an electrochemical modification in particular an electrodeposition and an electrochemical de-alloying.

The term "substrate material" refers to physical layers providing a surface that allows other substances to attach, bond or adhere thereto. The substrate material may be in a form of a wire, a foil, a foam or a mesh. The substrate material may be further a metallic substrate being made of a first metallic material.

Turning to the method, the method comprises the steps of:
a) bonding an alloy material made of the first metallic material and a second metallic material onto the substrate material; and
b) etching away at least some of first metallic material from the bonded substrate material to obtain a modified substrate material, wherein the modified substrate material has an increased specific surface area.

The term "alloy material" refers to a material containing a mixture of chemical elements in particular two or more elements, where at least one of which is a metal. In one embodiment, the alloy material is made of a first metallic material and a second metallic material. Preferably, the first metallic material is less chemically reactive than the second metallic material. More preferably, the first metallic material is selected from gold, silver or copper whereas the second metallic material is selected from silver, platinum or copper. Further preferably, the first metallic material is selected from gold or silver whereas the second metallic material is selected from silver or copper. Most preferably, the first metallic material is selected from gold whereas the second metallic material is selected from silver.

In an embodiment, the alloy material particularly in a form of micro-isles is bonded onto the substrate material being made of the first metallic material via electrodeposition. Following to the electrodeposition, at least some of the first metallic material from the bonded substrate material is etched away via electrochemical de-alloying. The second metallic material in the micro-isles initially serve as micromasks to shield the underneath first metallic material from etching, and are then detached from the bonded substrate material as the first metallic material is etch away. Preferably, the second metallic material is detached as a result of the under-cutting effect. In a particular embodiment, the detached second metallic material is in a form of particles that may have nano-pores. These materials may be recycled or processed for further use including but not limited to catalysis, electrode applications or the like.

The electrodeposition and electrochemical de-alloying processes are carried out in an electrochemical cell in particular the electrochemical cell with a three-electrode system. In one embodiment, the electrochemical cell may comprise a working electrode consisting of the metallic substrate material to be modified, a counter electrode preferably made of platinum, and a reference electrode in particular a saturated calomel electrode. A person having the ordinary skills in the art would appreciate that other suitable electrodes may also be applied in accordance with the present disclosure.

The electrodes as described above are connected in a solution of electrolyte. In one embodiment, the solution of electrolyte comprises an ion of the first metallic material and an ion of the second metallic material. In a particular embodiment, the first metallic material is less chemically reactive than the second metallic material. The solution of electrolyte may further include a reagent for passivating the second metallic material.

The term "passivating" refers to a process where a material becoming less affected or corroded by the environment after subjecting to that process. In a particular embodiment, the second metallic material is passivated by the reagent such that the first metallic material undergoes electrochemical de-alloying instead of the second metallic material. Preferably, the reagent comprises a sulphur-containing compound.

The term "sulfur-containing compound" used herein refers to organosulfur compounds, which are organic compounds that contain sulfur. The sulfur-containing compound may be selected from the group consisting of sulfides, disulfides, polysulfides, thioesters, sulfoxides, sulfones, thiosulfinates, thioketones, thioaldehydes or thioamides. Preferably, the sulfur-containing compound may be selected from the group consisting of disulfides, sulfoxides, thioketones, thioaldehydes or thioamides. Further preferably, the sulfur-containing compound is selected from the group consisting of thioamides. Most preferably, the sulfur-containing compound is thiourea.

In one embodiment, the solution of electrolyte may further include an acid in particular an inorganic acid. Preferably, the acid comprises $HNO_3$, $H_2SO_4$ or chloroauric acid.

The electrodeposition as described above is carried out by applying a predetermined voltage/current for a predetermined duration; and the electrochemical de-alloying as described above is carried out by applying another predetermined voltage/current for another predetermined duration. The voltage/current may be in the form of a pulse voltage/current waveform in particular a square wave. In a particular embodiment, the electrodeposition is carried out by applying a voltage of about −0.45V to −0.72V or a current density of about −0.1 to −10 mA/cm$^2$; and the electrochemical de-alloying is carried out by applying a voltage of about 0.5V to 0.8V or a current density of about 0.1 to 10 mA/cm$^2$. Each of the process is carried out between 1 to 120 seconds, preferably between 1 to 60 seconds.

After the electrodeposition and the electrochemical de-alloying processes as described above, the modified substrate material has nanostructured surface with nano-pores and therefore having a higher specific surface area and surface roughness as compared with the initial metallic substrate material.

The method further includes the step of repeating the electrodeposition and electrochemical de-alloying processes when the modified substrate material does not possess a desired surface nanostructure in particular the size and/or number of pores are not ideal for a particular application. In one embodiment, the electrodeposition and electrochemical de-alloying processes are repeated for 1 to 300 times, preferably for 20 to 200 times.

In the second aspect of the invention, there is provided a substrate for Surface Enhanced Raman Spectroscopy (SERS) comprising a modified substrate material formed in accordance with the method mentioned in the first aspect of the invention.

The inventors have, through their own research, trials and experiments, devised that the modified substrate material has a great potential in SERS application. In one embodiment, the modified substrate material shows an enhanced sensitivity as compared with the unmodified substrate material. In another embodiment, the modified substrate material may be applied to detect the content of peanut oil in sesame oil.

Other than the SRES applications, the modified substrate material may be further applied as photocatalysts for degrading organic compounds. In one embodiment, the modified substrate material is a foam and is applied to photodegrade methyl blue. The modified substrate material shows a much higher degradation performance than the unmodified substrate.

The modified substrate material of the present invention may be further processed by generating, bonding or coating a metallic, metallic oxide, electro-active or photocatalytic oxide material on the surface of the modified substrate material. For example, the modified substrate material may be coated with a $MnO_2$, $TiO_2$, $RuO_2$, $IrO_2$ or $PtO_2$ to form electrodes for electrochemical supercapacitors, offering an enhanced conductivity.

The scanning electron microscope (SEM) images were taken on a Philips XL30 FEG SEM. Energy dispersive X-ray (EDX) spectra were obtain on a JEOL JSM-6334F field emission SEM system. SERS measurements were performed on a Renishaw 2000 microscope equipped with a HeNe laser (632.8 nm) of 17 mW power and the light spot 2 μm wide. For the UV illumination source, a mercury lamp with the maximum output wavelength of 365 nm was used. For the visible light source, a 300 W tungsten lamp was used. The lamps were kept at a distance of 15 cm from the reaction vessel with the light intensity there measured to be 206 mW/cm$^2$. The diameters of reaction vessels were 4.0 cm.

With reference to FIG. 1, there is provided example fabrication procedures of the metallic substrate material with nanostructured surface. First, micro-isles of an alloy made of metal A and metal B are electrodeposited onto a metal wire being made of metal A. Second, electrochemical de-alloying is carried out to selectively etch away the A component from the AB isles and exposing the surface of the metal wire. The B component in the micro-isles initially serve as micro-masks to shield the underneath metal A from etching, and are then detached from the metal wire due to the under-cutting effect, leaving the roughened metal wire for next electrodeposition/electrochemical de-alloying cycle.

In one example embodiment, there is provided electrodeposition of Ag and electrochemical de-alloying Au. For instance, the electrochemical processes were conducted at room temperature using a computer controlled potentiostat (HEKA, PG310) in a 50 ml solution contain silver nitrate ($AgNO_3$(s), 0.02 M) and thiourea (0.05 M). Au wire with two ends fixed to the ITO glass was used as the working electrode, a platinum ring was used as the counter electrode, and saturated calomel electrode was used as the reference electrode. The reference electrode was put 1 cm away from the working electrode. A voltage/current square-wave was applied which periodically modulated between two extreme values for n cycles: a cathodic voltage/current of $V_1$ or $i_1$, for a time duration of $t_1$ for electrodepositing the Au—Ag alloy isles, and an anodic voltage/current of $V_2$ or $i_2$ for a time duration of $t_2$ for selectively etching Au (typically, $V_1$=−0.72 V or =−5 mA/cm$^2$, $V_2$=0.7 V or $i_2$=5 mA/cm$^2$, $t_1$=$t_2$=10 sec, and n=100). The roughened Au wire was rinsed with deionized (DI) water and dried under $N_2$ prior to any measurements.

In this case, Ag micro-isles were electrodeposited onto the Au wire for 5 seconds to serve as masks to shield the Au wire and then the Au wire underwent de-alloying for 5 seconds. This electrodeposition/de-alloying cycle was repeated for 100 times to obtain an Au wire with a desired nanostructured surface. It is appreciated that Ag is more susceptible to de-alloying when Ag and Au are present together. Hence, the inventor intentionally added a passivating reagent, thiourea, to the electrolyte solution. By this way, the presence of S may lead to the formation of $Ag_2S$ thin film on the Ag surface, protecting the inner Ag from anodic dissolution. Therefore, it can ensure the selective dissolution of Au component.

Figure 2B:
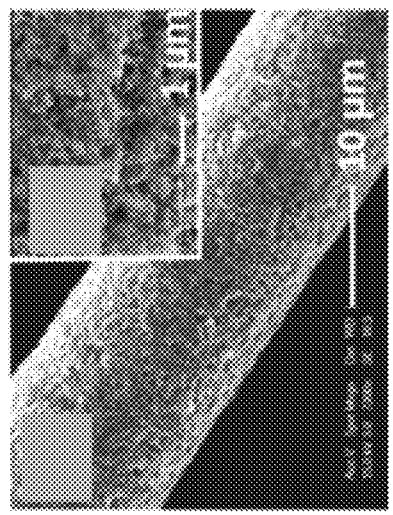
FIGS. 2a, 2b, 2c, and 2d provide SEM images showing the morphology of the Au wire and the nanoporous Ag particles.
Figure 2D:
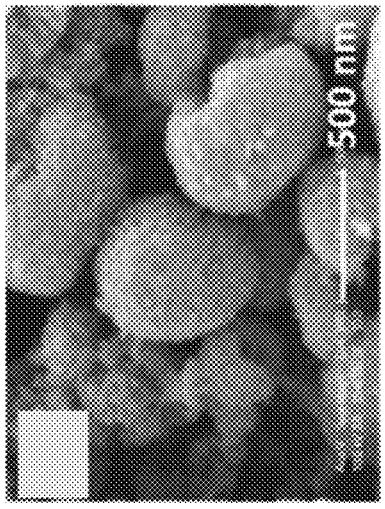
Figure 2A:
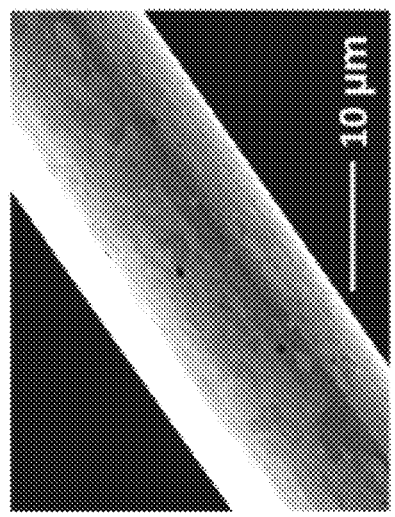
Figure 2C:
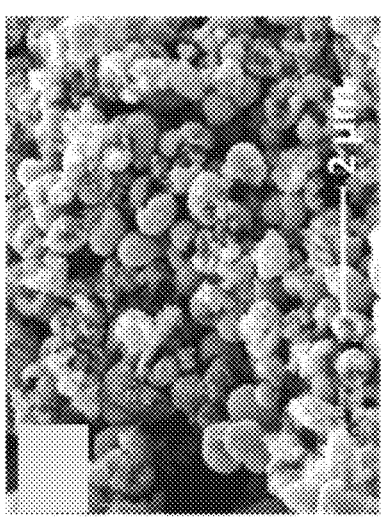
Figure 3B:
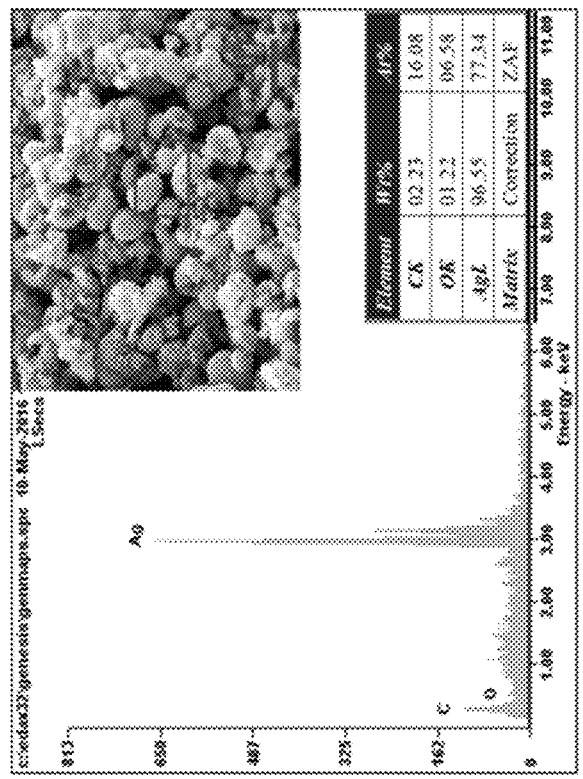
FIGS. 3a and 3b refer to spectra of EDX measurements.
Figure 3A:
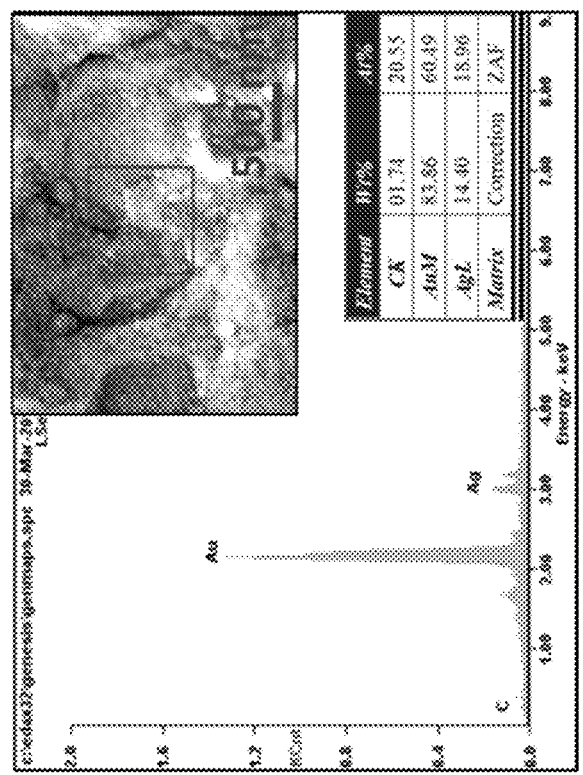

FIGS. 2a and 2b show the SEM images of a commercial Au wire and the Au wire modified by the method of the present invention. Upon repetitive electrodeposition/dealloying treatment, the commercial Au wire was greatly roughened with the composition kept to be 85 wt % of Au and 15 wt % of Ag from the EDX measurements (FIG. 3a). The precipitates from the reaction electrolyte were also investigated. The precipitates were obtained by centrifuging the electrolyte at 4000 rpm for 10 minutes, followed by washing with water under centrifugation at 4000 rpm for 10 minutes for 3 times. EDX measurements on the precipitates revealed that they are constituted of Ag (FIG. 3b). A close examination of the precipitates by SEM further revealed that they were Ag micro-particles (FIGS. 2c and 2d). All these results were in good agreement with the process as illustrated in FIG. 1.

The roughened Au wire is particularly suitable as a substrate in Surface Enhanced Raman Spectroscopy (SERS) applications. To verify this, the Au wire was immersed in a solution of Rhodamine B ($10^{-12}$ M) for 3 hours prior to SERS measurements. In order to maximize the homogeneity of the signal collected, the Au wire was rolled to provide a relatively flat surface during the measurement.

Figures 4A, 4B:
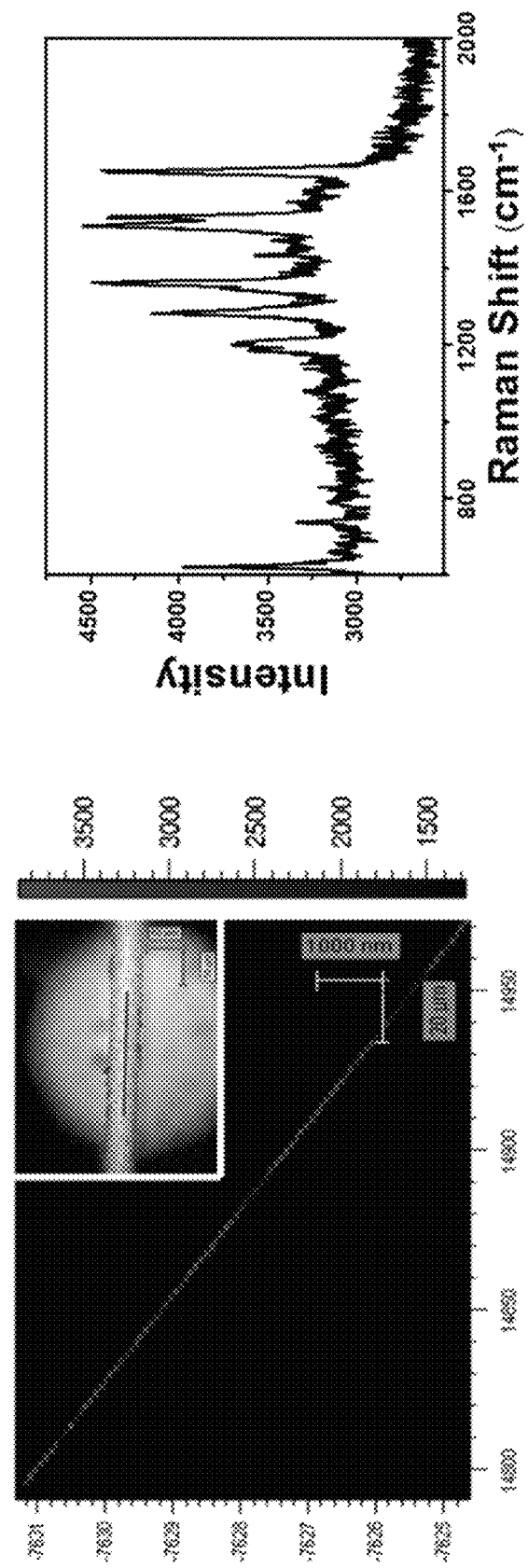
Figure 5:
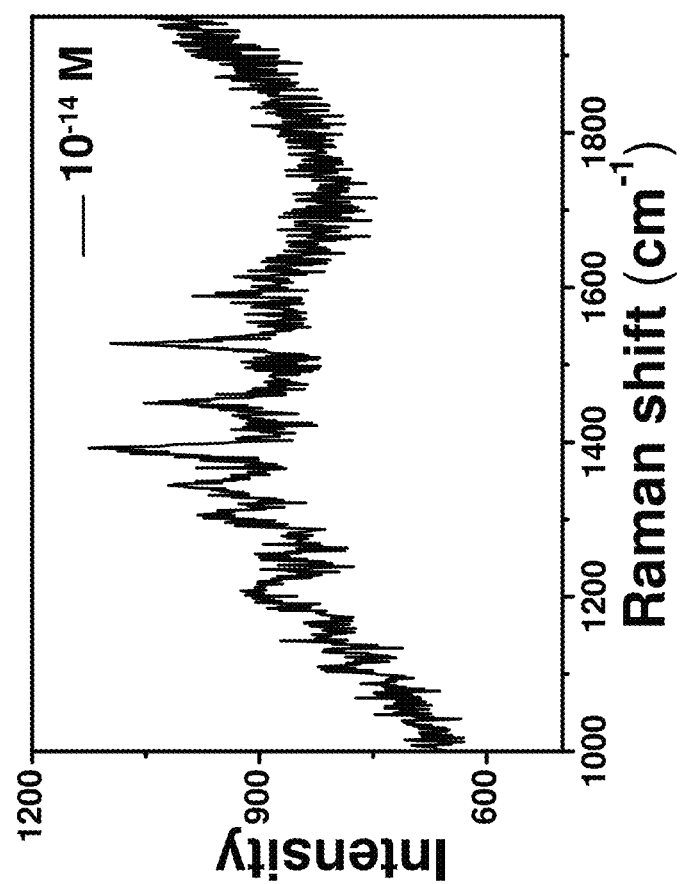
FIG. 5 refers to the SERS spectrum of Rhodamine B ($10^{-14}$ M) measured on the roughened Au wire.
Figure 6B:
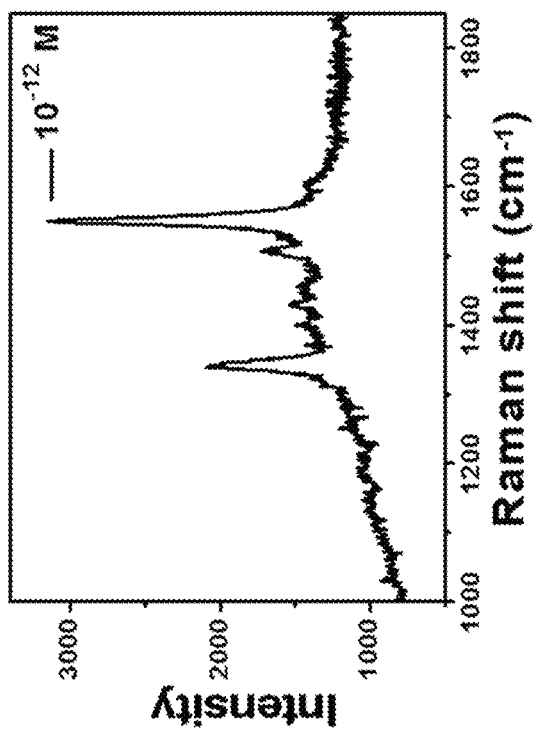
FIG. 6b refers to the Raman spectra of Rhodamine B ($10^{-12}$ M) measured on the same roughened Au wire after two months.
Figure 6A:
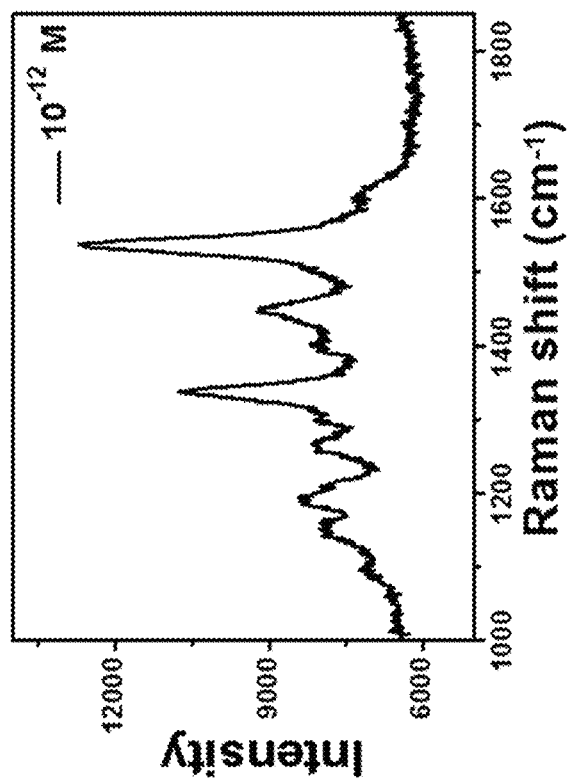
FIG. 6a refers to the Raman spectra of Rhodamine B ($10^{-12}$ M) measured on the roughened Au wire.

The two-dimensional point-by-point SERS mapping images (FIG. 4) clearly show that the roughened Au wire enabled very strong and uniform signal of SERS enhancement (FIG. 4b). The extremely strong signal may be due to some residual Ag trapped in the roughened Au wire after the treatment (FIG. 3a). A line mapping measurements were selected at 1362 cm$^{-1}$ of the roughened Au wire collected in 2 μm steps. During the mapping, more than 300 points were collected wherein there are almost more than 95% of the points showing Rhodamine B signals. The detection limit of the roughened Au wire was further investigated. Referring to FIG. 5, signals from Rhodamine B was still observed when the concentration of Rhodamine B was lowered to $10^{-14}$ M, indicating an extremely high sensitivity of the roughened Au wire. Furthermore, the inventor investigated the performance of the wire after two months and found that the signals of Rhodamine B were pertained, suggesting the high stability of the roughened Au wire (FIG. 6).

Together, the high sensitivity and stability of the roughened Au wire as well as the convenient and low cost method preparing the same, rendering the wire highly desirable as SERS substrates.

Figure 7A:
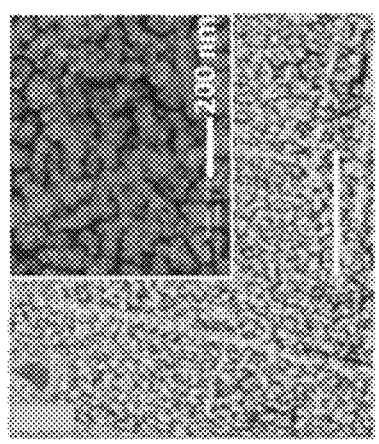
FIG. 7a refers to the SEM image of the commercial Au foil (scale bar: 1 μm).
Figure 7B:
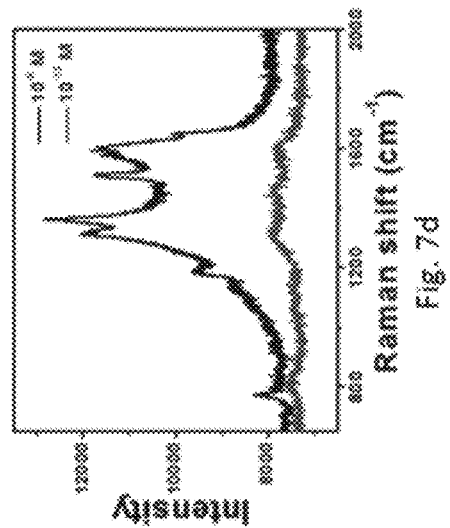
FIG. 7b refers to the SEM image of the roughened Au foil (scale bar: 1 μm).
Figure 7C:
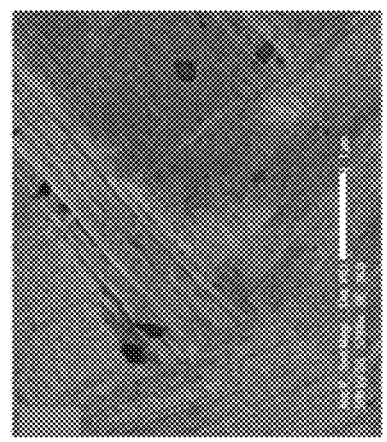
FIG. 7c refers to the SERS spectra of Rhodamine 6G ($10^{-8}$ M, black line; $10^{-13}$ M, red line) measured on the commercial Au foil.
Figure 7D:
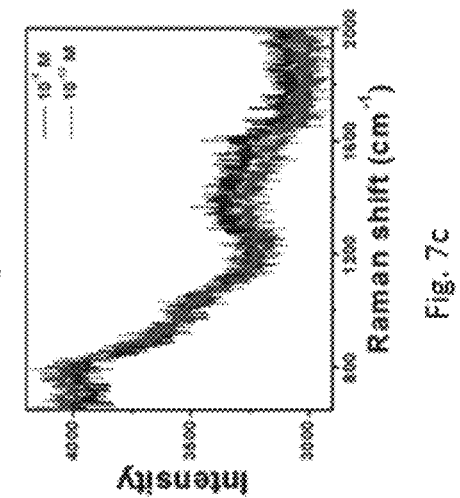
FIG. 7d refers to the SERS spectra of Rhodamine 6G ($10^{-8}$ M, black line; $10^{-13}$ M, red line) measured on the roughened Au foil.

Other than Au wire, Au foil has also been modified using the method as described above. SEMs images indicated that the surface of the Au foil apparently possesses nanostructures after modification as compared with the one without modification (FIGS. 7a and 7b). The ability of the roughened Au foil to detect Rhodamine 6G was compared with the commercial Au foil. Referring to FIGS. 7c and 7d, it is clearly shown that the signals from the commercial Au foil was much weaker compared to those from the roughened Au foil irrespective of the Rhodamine 6G concentrations. This example further suggests that the method of the present invention can be widely applied in different forms of metallic materials.

Figures 8A, 8B, 8C:
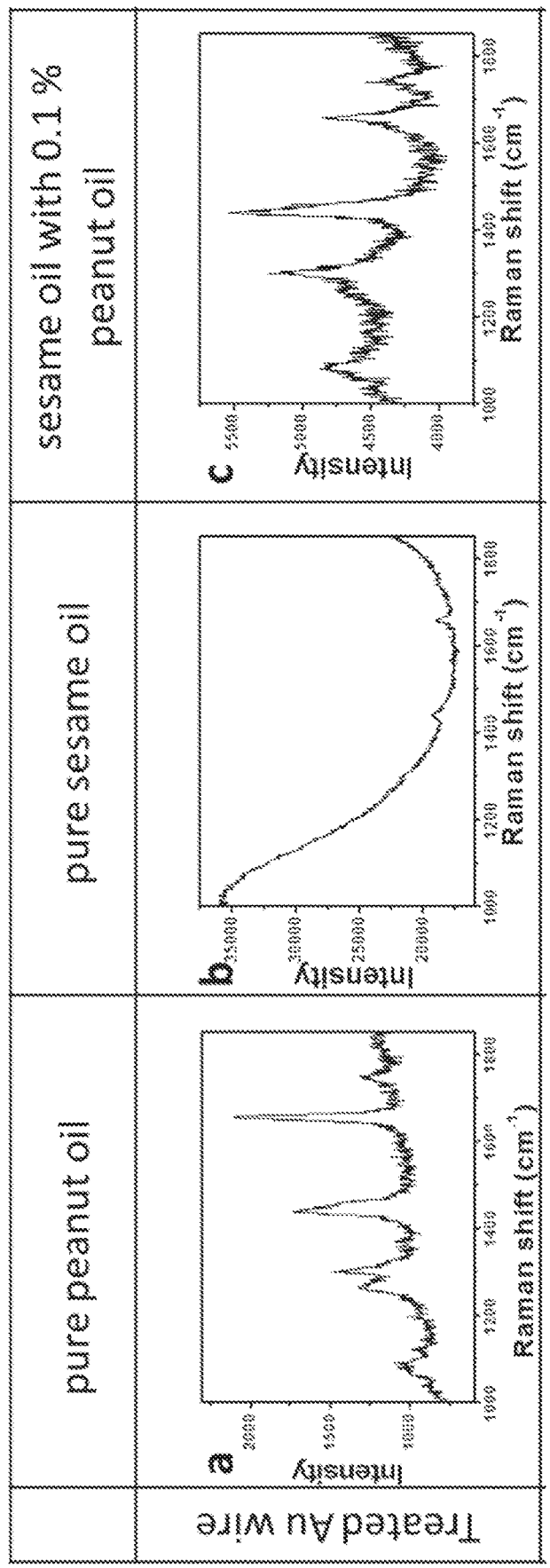
Figures 8D, 8E:
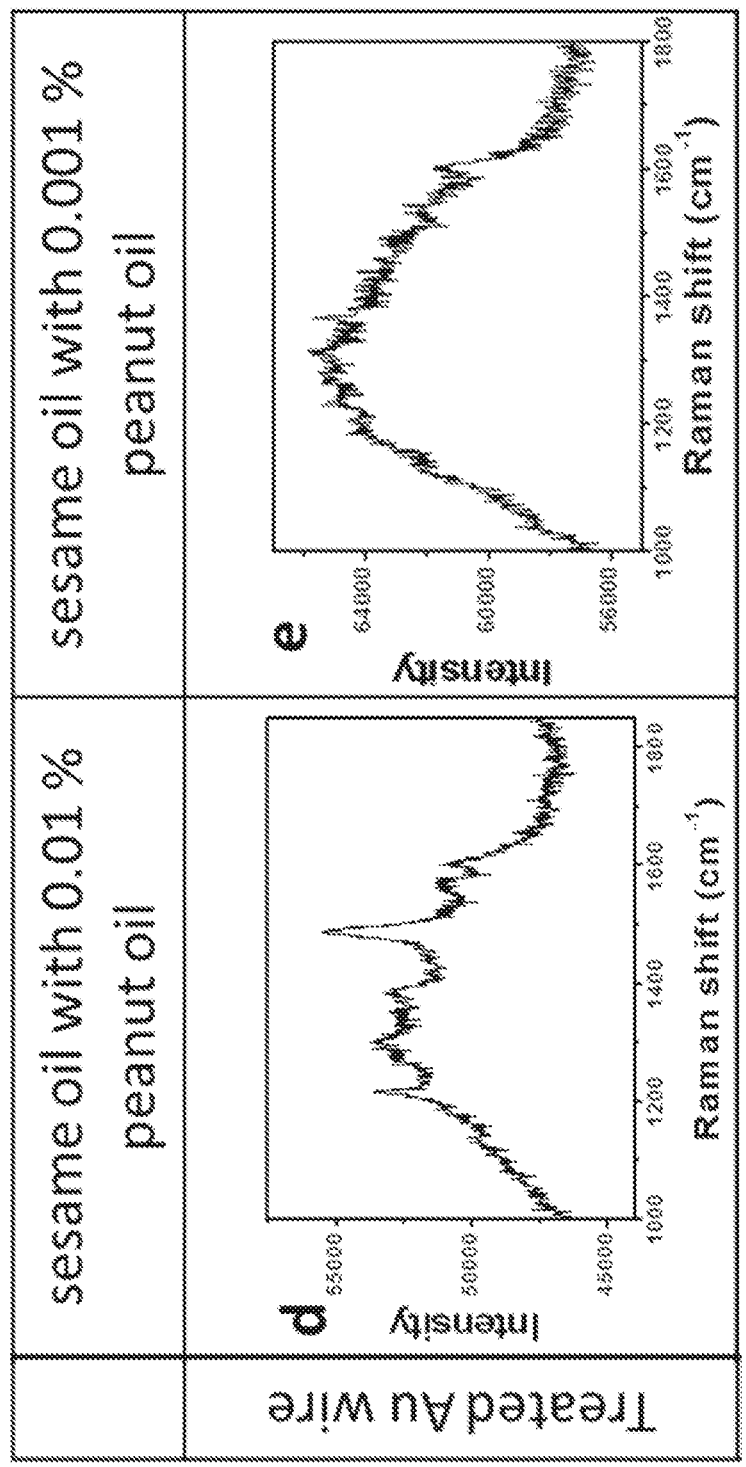

The inventors have also devised that vegetable oils are essential in our daily diet, and owing to the potential allergic issue, it is of paramount importance to know the composition of the vegetable oil particularly the content of peanut in the oil. In this example, sesame oil with different contents of peanut oil was measured on the commercial Au wire and the roughened Au wire. Both the Raman spectra of pure peanut oil on the roughened Au wire (FIG. 8a) and the commercial Au wire (FIG. 8f) showed peanut signals, in which the signal from the roughened Au wire was found to be much stronger than that of the commercial one. The same trend was observed for the pure sesame oil (FIGS. 8b and 8g). However, when the sample was switched to sesame oil with 0.1% peanut oil, the signal of peanut oil was only observed in roughened Au wire (FIG. 8c) but not in the commercial Au wire (FIG. 8h). Importantly, when the content of peanut oil is further reduced to 0.01% and 0.001%, the signal of peanut oil was only observed in roughened Au wire (FIGS. 8d and 8e). In sharp contrast, no signal of peanut oil was detected in commercial Au wire.

In one example embodiment, there is provided electrodeposition of Cu and electrochemical de-alloying Ag. Preferably, the electrochemical processes were conducted at room temperature using a three-electrode cell system containing a solution of copper(II) sulfate (0.2 M) and HNO$_3$ (0.1 M). Ag wire with two ends fixed to the ITO glass (GULUO glass) was used as the working electrode, a platinum ring was used as the counter electrode, and saturated calomel electrode was used as the reference electrode. A pulse voltage/current waveform was applied which periodically modulated between two extreme values for n cycles: a cathodic voltage/current of $V_1$ or $i_1$ for a time duration of $t_1$ for electrodepositing the Ag—Cu alloy isles, and an anodic voltage/current of $V_2$ or $i_2$ for a time duration of $t_2$ for selectively etching Ag (typically, $V_1=-0.45$ V or $i_1=-7$ mA/cm$^2$, $V_2=0.8$ V or $i_2=7$ mA/cm$^2$, $t_1=t_2=5$ sec, and n=200). The roughened Ag wire was rinsed with deionized (DI) water and dried under $N_2$ prior to any measurements.

Figure 9A:
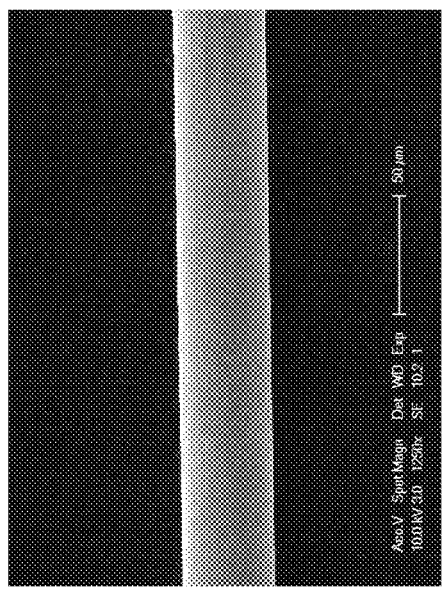
FIGS. 9a, 9b, and 9c provide SEM images of Ag wires.
Figure 9B:
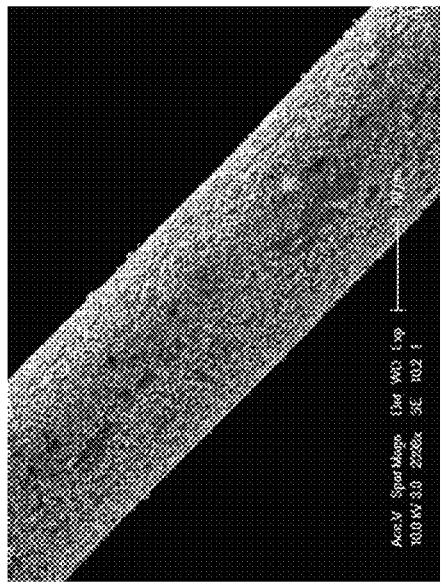
Figure 9C:
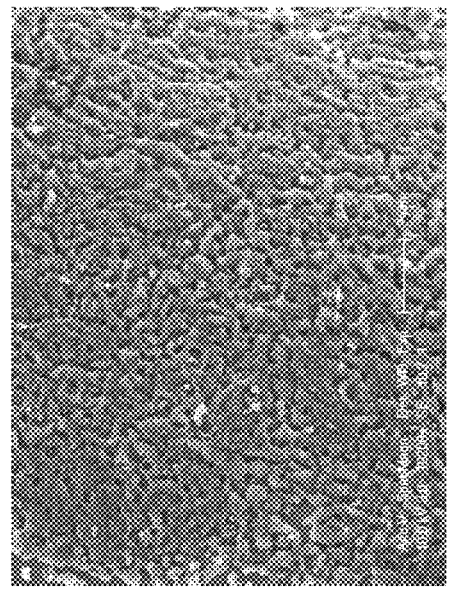

In this case, Cu micro-isles were electrodeposited onto the Ag wire for 5 seconds to serve as masks to shield the Ag wire and then the Ag wire underwent de-alloying for 5 seconds. This electrodeposition/de-alloying cycle was repeated for 200 times to obtain an Ag wire with a desired nanostructured surface. The surface of the Ag wire was greatly roughened after modification (FIGS. 9b and 9c) as compared with the one without modification (FIG. 9a).

Figure 10B:
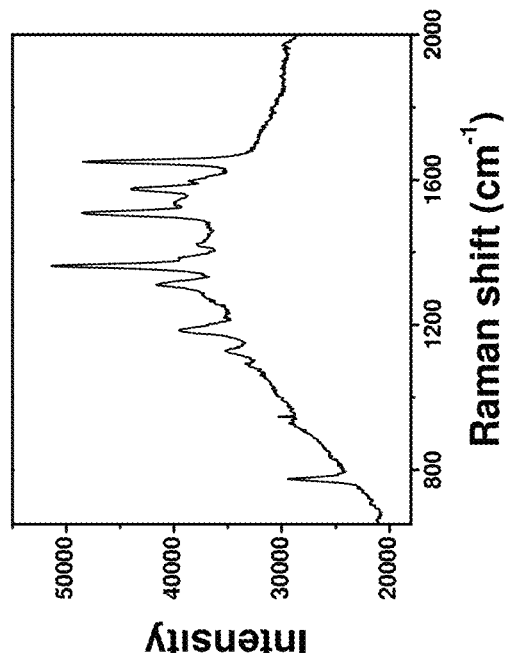
FIGS. 10a and 10b refer to the SERS spectra of Rhodamine 6G ($10^{-11}$ M) measured on Ag wires.
Figure 10A:
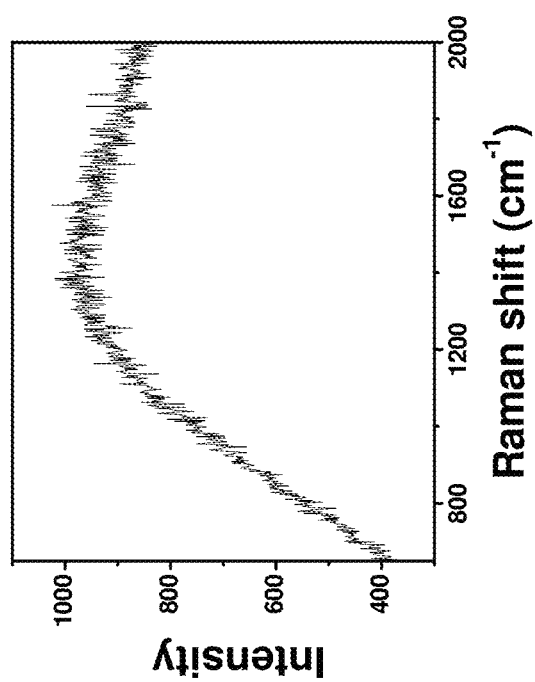
Figure 11:
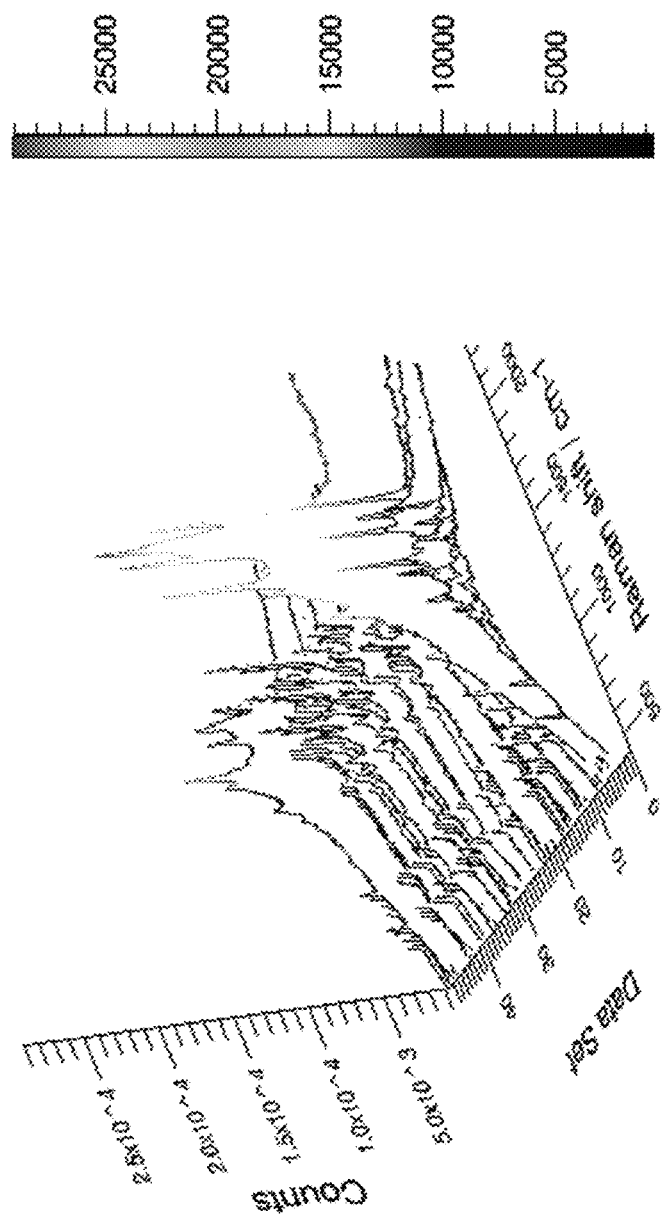
FIG. 11 refers to the mapping of SERS spectra of Rhodamine 6G ($10^{-11}$ M) measured along a roughened Ag wire.
Figure 12:
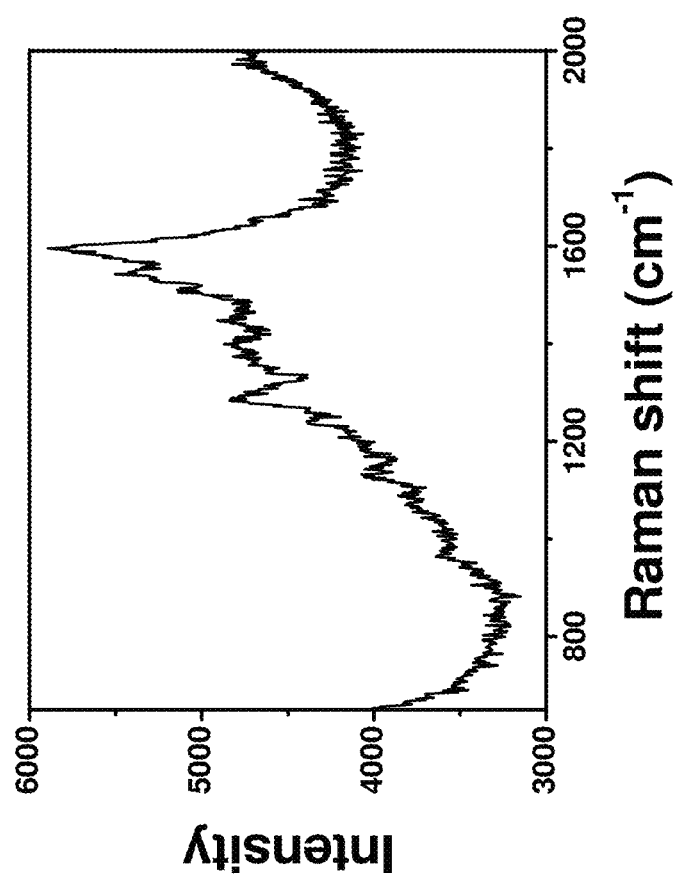
FIG. 12 refers to the SERS spectrum of Rhodamine 6G ($10^{-15}$ M) measured on the roughened Ag wire.

The greatly roughened surface is found to be beneficial for various applications particularly in SERS applications. SERS measurements revealed that the roughened Ag wire displayed dramatically stronger signal than the unmodified one in the detection of Rhodamine 6G (FIG. 10). In addition, the signal along the roughened Ag wire was found to be uniform (FIG. 11) and the concentration of Rhodamine 6G measured on the roughened Ag wire is determined to be as low as $10^{-15}$ M (FIG. 12).

In one example embodiment, there is provided electrodeposition of Pt and electrochemical de-alloying Cu. Preferably, the electrochemical deposition and dealloying were carried out at room temperature using a computer-controlled potentiostat (HEKA, PG310) in a three-electrode electrochemical cell which contained a saturated calomel reference electrode, a platinum ring as the counter electrode, and the copper foam as the working electrode. An aqueous solution of copper sulfate pentahydrate (0.02 M) (Riedal-Dehaën), 0.005 M of K$_2$PtCl$_4$, and 0.5 M of H$_2$SO$_4$ was used as the electrolyte. A voltage/current square-wave was applied which periodically modulated between two extreme values for n cycles: a cathodic voltage/current of $V_1$ or $i_1$ for a time duration of $t_1$ for electrodepositing the Cu—Pt alloy isles, and an anodic voltage of $V_2$ or $i_2$ for a time duration of $t_2$ for selectively etching Au (typically, $V_1=-0.5$ V or $i_1=-4$ mA/cm$^2$, $V_2=0.5$ V or $i_2=4$ mA/cm$^2$, $t_1=t_2=10$ sec, and n=100). The roughened Cu foam was rinsed with deionized (DI) water and dried under $N_2$ prior to any measurements.

Figure 13B:
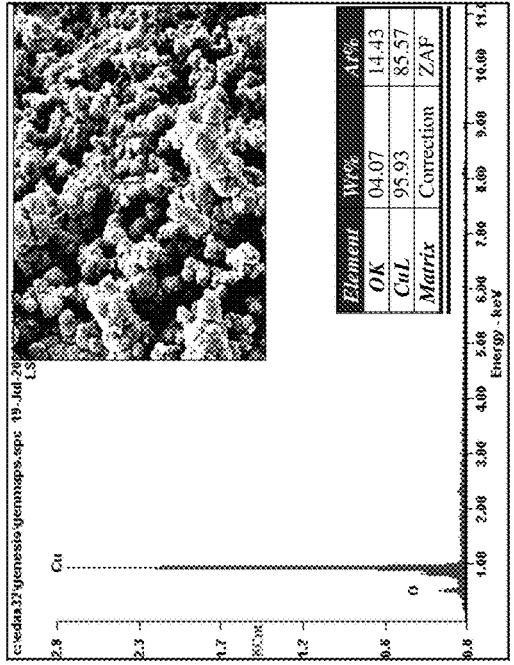
FIG. 13b refers to the EDX spectrum of the roughened Cu foam; the insert shows the region of interest for the measurement.
Figure 13D:
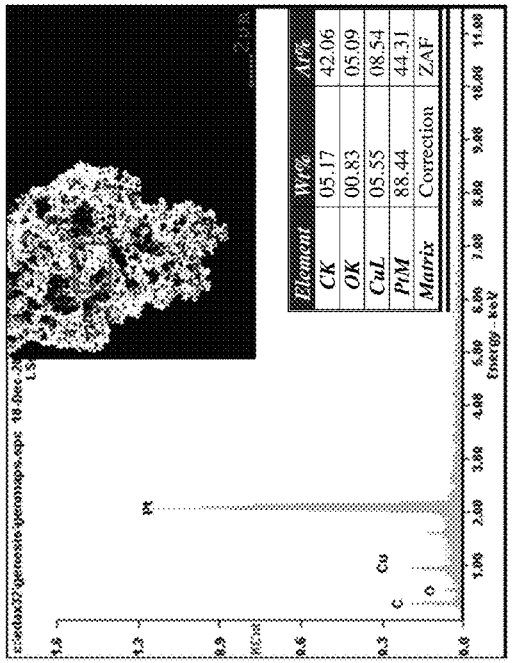
FIG. 13d refers to the EDX spectrum of the nanoporous Pt particles; the insert shows the region of interest for the measurement.
Figure 13A:
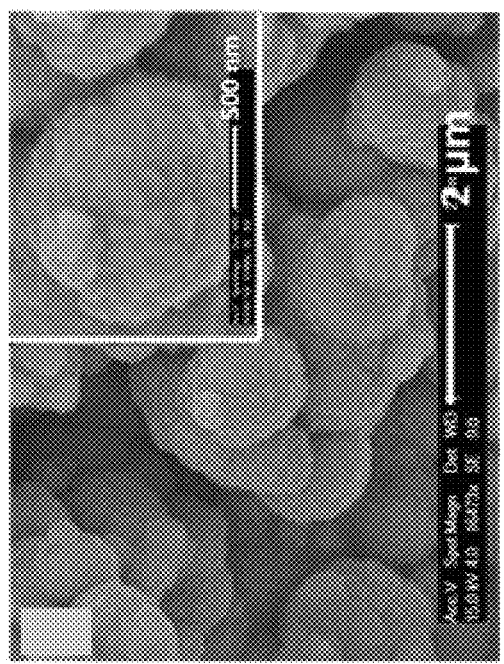
FIG. 13a is the SEM image of the roughened Cu foam.
Figure 13C:
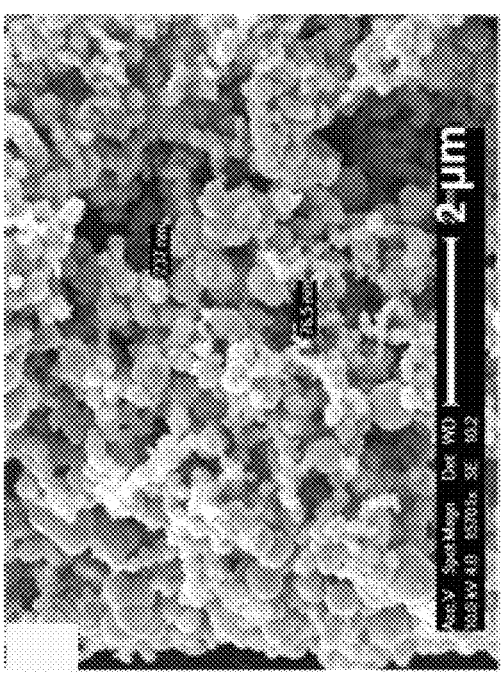
FIG. 13c is the SEM image of the nanoporous Pt particles generated during the modification.

In this example, Pt micro-isles were electrodeposited onto the Cu foam for 10 seconds to serve as masks to shield the Cu foam and then the Cu foam underwent de-alloying for 10 seconds. This electrodeposition/de-alloying cycle was repeated for 100 times to obtain a Cu foam with a desired nanostructured surface (FIG. 13a) as evidenced by EDX measurements (FIG. 13b). The precipitates from the reaction electrolyte were also investigated. The precipitates were obtained by centrifuging the electrolyte at 4000 rpm for 10 minutes, followed by washing with water under centrifugation at 4000 rpm for 10 minutes for 3 times. SEM and EDX analysis revealed the precipitates obtained are Pt particles with nano-pores (FIGS. 13c and 13d). All these results were in good agreement with the process as illustrated in FIG. 1.

Figure 14:
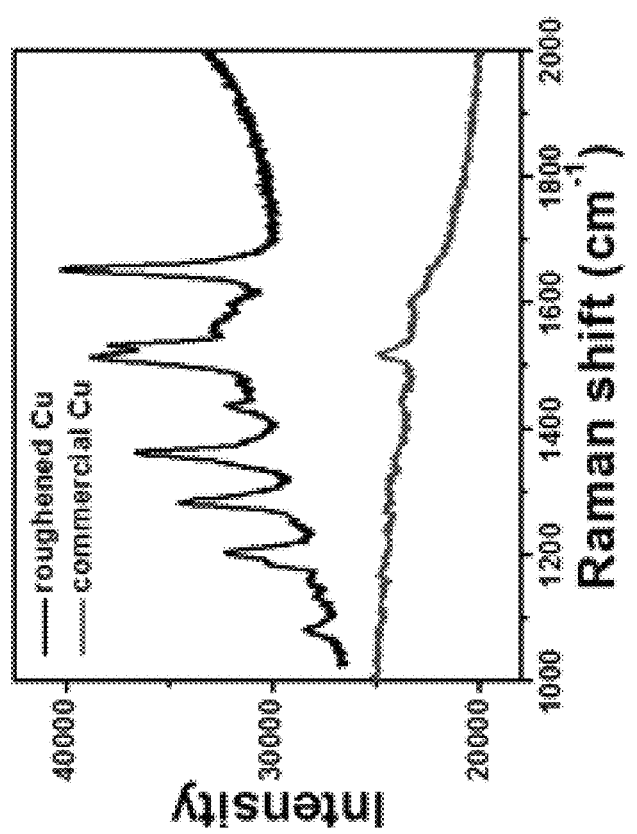
FIG. 14 refers to the SERS spectra of Rhodamine B ($10^{-6}$ M) measured on the commercial Cu foam (red line) and the roughened Cu foam (black line).
Figure 15:
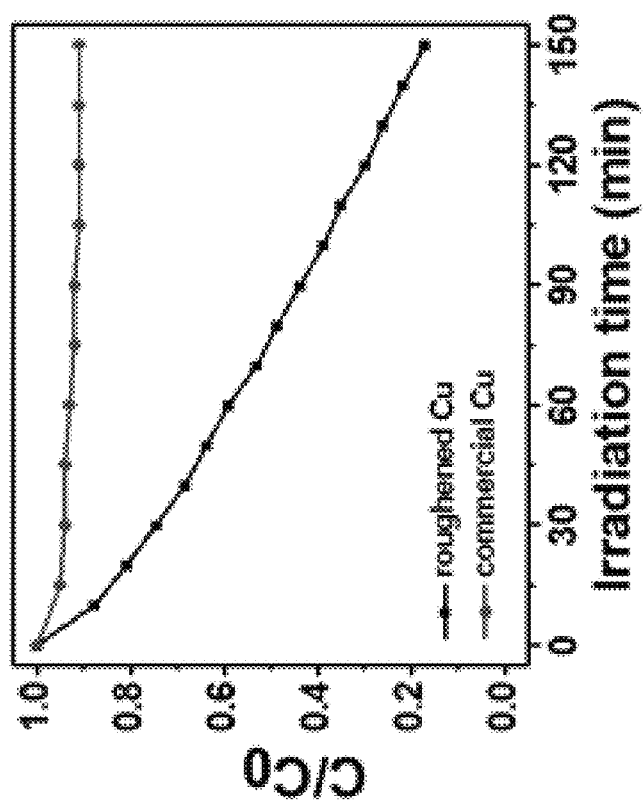
FIG. 15 refers to the plots of $C/C_0$ against irradiation time showing the photocatalytic performance of the roughened Cu foam and the commercial Cu foam.

The ability of the roughened Cu foam as a substrate in SERS application has been demonstrated. The Cu foam was immersed in a solution of Rhodamine B ($10^{-6}$ M) for 3 hours prior to SERS measurements. As shown in FIG. 14, the signal generated by the roughened Cu foam is much stronger than the one generated by the commercial Cu foam.

The inventors have also devised that the applications of the roughened metallic substrate material is not limited to SERS and it may be further applied in the photodegradation of organic compounds such as methyl blue. For instance, Cu foam (1 cm×1 cm) was dispersed with 10 ml of methyl blue (MB) solution ($1.5×10^{-5}$ M) in a dark room for 3 hours to allow an adsorption-desorption equilibrium established between the MB and Cu foam. Upon irradiation for 150 minutes, it can be clearly seen that the signal ratio of the roughened Cu foam decreased significantly from 1.0 to 0.2 whereas that of the commercial Cu foam remained almost unchanged. These results suggest that the photodegradation performance of the roughened Cu foam is much higher than the commercial Cu foam.

The invention claimed is:

1. A method for chemically modifying a surface of a metallic substrate material being made of a first metallic material comprising the steps of:
   a) bonding, by way of electrodeposition in an electrochemical cell containing an acidic electrolyte solution, a second metallic material onto the substrate material so as to form an alloy material made of the first metallic material and the second metallic material onto the substrate material, wherein the first metallic material is less chemically reactive than the second metallic material, wherein the first metallic material comprises at least one of gold, silver, and copper, and wherein the second metallic material comprises at least one of silver, copper, and platinum; and
   b) etching away, by way of electrochemical de-alloying in the electrochemical cell containing the acidic electrolyte solution, at least some of the first metallic material from the bonded substrate material to obtain a modified substrate material, wherein the modified substrate material has an increased specific surface area and is a substrate for Surface Enhanced Raman Spectroscopy (SERS).

2. The method of claim 1, wherein the modified substrate material has a higher specific surface area than the substrate material.

3. The method of claim 1, wherein the electrodeposition of the alloy material onto the metallic substrate material is carried out by manipulating at least one of a voltage or a current density applied to the electrochemical cell.

4. The method of claim 1, the electrochemical de-alloying of at least some of the first metallic material is carried out by manipulating at least a voltage or a current density applied to the electrochemical cell.

5. The method of claim 1, wherein the acidic electrolyte solution comprising an ion of the second metallic material.

6. The method of claim 5, wherein the acidic electrolyte solution further includes a reagent for passivating the second metallic material.

7. The method of claim 6, wherein the reagent comprises a sulfur-containing compound.

8. The method of claim 7, wherein the sulfur-containing compound is thiourea.

9. The method of claim 1, wherein the acidic electrolyte solution comprises $HNO_3$, $H_2SO_4$ or chloroauric acid.

10. The method of claim 1, wherein the alloy material is in a form of micro-isles.

11. The method of claim 1, wherein step b) further including the step of detaching at least some of the second metallic material from the bonded substrate material as the first metallic material is etched away.

12. The method of claim 11, wherein the second metallic material detached from the bonded substrate is in a form of particles.

13. The method of claim 12, wherein the detached second metallic material includes nano-pores.

14. The method of claim 1, wherein the modified substrate material includes a nanostructured surface with nano-pores.

15. The method of claim 1, wherein steps a) and b) are carried out for 1 to 60 seconds.

16. The method of claim 3, wherein the electrodeposition is carried out by applying at least one of a voltage ranged from about −0.45V to −0.72V or a current density ranged from −0.1 to −10 mA/cm².

17. The method of claim 4, wherein the electrochemical de-alloying is carried out by applying at least one of a voltage ranged from about 0.5V to 0.8V or a current density ranged from 0.1 to 10 mA/cm².

18. The method of claim 1, further including the step of: repeating steps a) and b).

19. The method of claim 18, wherein steps a) and b) are repeated for 20 to 200 times.

20. The method of claim 1, wherein the metallic substrate material is in a form of a wire, a foil, a foam or a mesh.

21. The method of claim 1, wherein the first metallic material is less electrochemically reactive than the second metallic material.

* * * * *